United States Patent
Kaila et al.

(10) Patent No.: US 11,789,801 B2
(45) Date of Patent: *Oct. 17, 2023

(54) ERROR LOGGING DURING SYSTEM BOOT AND SHUTDOWN

(71) Applicant: VMware, Inc., Palo Alto, CA (US)

(72) Inventors: Ashish Kaila, Palo Alto, CA (US); Tobias Stumpf, Munich (DE); Mukund Gunti, Mountain View, CA (US)

(73) Assignee: VMware, Inc, Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/716,113

(22) Filed: Apr. 8, 2022

(65) Prior Publication Data

US 2022/0229719 A1    Jul. 21, 2022

Related U.S. Application Data

(63) Continuation of application No. 17/142,453, filed on Jan. 6, 2021, now Pat. No. 11,301,312.

(51) Int. Cl.
*G06F 11/00* (2006.01)
*G06F 11/07* (2006.01)

(52) U.S. Cl.
CPC ...... *G06F 11/0778* (2013.01); *G06F 11/0751* (2013.01); *G06F 11/0787* (2013.01)

(58) Field of Classification Search
CPC ............. G06F 11/0778; G06F 11/0751; G06F 11/0787
USPC ...................................................... 714/1–57
See application file for complete search history.

(56) References Cited

U.S. PATENT DOCUMENTS

| | | | |
|---|---|---|---|
| 6,889,340 B1 * | 5/2005 | Bramley, Jr. ....... | G06F 11/2284 714/36 |
| 9,274,902 B1 * | 3/2016 | Morley ............... | G06F 11/2002 |
| 9,710,321 B2 | 7/2017 | Zhao | |
| 2001/0042225 A1 * | 11/2001 | Cepulis ................ | G06F 11/073 714/25 |
| 2003/0212936 A1 * | 11/2003 | Neuman ............. | G06F 11/2268 714/E11.147 |

(Continued)

OTHER PUBLICATIONS

Sakthikumar, et al., "White Paper: A Tour Beyond BIOS Implementing the ACPI Platform Error Interface with the United Extensible", Jan. 2013.

*Primary Examiner* — Sarai E Butler
(74) *Attorney, Agent, or Firm* — Clayton, McKay & Bailey, PC (57) ABSTRACT

Systems and methods are described for improved error logging during system boot and shutdown. A hardware initialization firmware on a computing device can include a logging module. When errors occur during early system booting or late system shutdown, the firmware can create error logs. The logging module can receive the error logs and prioritize them according to a set of rules. The logging module can select error logs of the highest priority up to a predetermined maximum amount. The logging module can modify the error logs using a shorthand form and write them to nonvolatile random-access memory. The firmware can initialize runtime services and launch an operating system. A system logger on the operating system can retrieve the error logs, save them to a file, and erase them from the memory.

20 Claims, 5 Drawing Sheets

(56) References Cited

U.S. PATENT DOCUMENTS

| | | | |
|---|---|---|---|
| 2004/0153833 A1* | 8/2004 | Deacon | G06F 11/0727 |
| | | | 714/38.14 |
| 2005/0193271 A1 | 9/2005 | Linam | |
| 2005/0283665 A1 | 12/2005 | Levering | |
| 2006/0277444 A1 | 12/2006 | Holian | |
| 2007/0174720 A1* | 7/2007 | Kubo | G06F 11/008 |
| | | | 714/42 |
| 2012/0278655 A1 | 11/2012 | Lin | |
| 2014/0089726 A1* | 3/2014 | Warnes | G06F 11/1008 |
| | | | 714/E11.144 |
| 2015/0058669 A1* | 2/2015 | Salle | G06F 11/0706 |
| | | | 714/30 |
| 2015/0089280 A1* | 3/2015 | Sade | G06F 11/0793 |
| | | | 714/6.12 |
| 2015/0378846 A1* | 12/2015 | Hagiwara | G06F 11/1438 |
| | | | 714/19 |
| 2016/0041865 A1* | 2/2016 | Uruma | G06F 11/0787 |
| | | | 714/48 |
| 2016/0124830 A1* | 5/2016 | Banerjee | G06F 11/3409 |
| | | | 714/37 |
| 2016/0132401 A1 | 5/2016 | O'Hare | |
| 2018/0074884 A1* | 3/2018 | Cady | G06F 11/0787 |
| 2019/0332392 A1* | 10/2019 | Pant | H04L 9/3213 |
| 2020/0089571 A1* | 3/2020 | Narasimhan | G06F 11/1417 |
| 2021/0157756 A1* | 5/2021 | Gutierrez | G06F 11/3034 |

\* cited by examiner

ERROR LOGGING DURING SYSTEM BOOT AND SHUTDOWN

This application claims priority as a continuation of U.S. patent application Ser. No. 17/142,453, filed Jan. 6, 2021, now U.S. Pat. No. 11,301,312, which is expressly incorporated herein in its entirety.

BACKGROUND

Most operating systems log events that occur during boot and shutdown operations. These logs often identify whether certain processes successfully executed. These logs can be vital for being able to troubleshoot any errors that occur during boot or shutdown of an operating system. The operating system writes these logs either to a file on a disk or to a network logging service, which require certain input/output operators to be functional.

One problem with current boot and shutdown logging methods is that the operating system cannot log events that occur during early system boot and late system shutdown. For example, computing devices typically have a firmware interface that is responsible for initializing and shutting down hardware components. These stages in the boot and shutdown processes occur before the operating system launches and after it has shut down, so the operating system cannot create logs of any errors that occur. Many operating system processes rely heavily on correct driver and firmware behaviors. Hardware initialization and shutdown errors can be catastrophic for an operating system. Without late shutdown or early boot logs, it can be extremely difficult to identify the source of such errors.

Current firmware interfaces are unable to rectify this issue. For example, Basic Input/Output Systems ("BIOS") have extremely limited functionality for identifying boot errors. When an error is detected, BIOS firmware can display a message or cause the computer to emit cryptic beep codes that a user must look up in a manual to identify. The newer Unified Extensible Firmware Interface ("UEFI") specifications provide the ability to pass information from the device firmware directly to the operating system using UEFI variables. UEFI is not typically used for error logging, but UEFI variables can be saved to non-volatile random-access memory ("NVRAM") and later retrieved by the operating system after it launches. However, the amount of space available in the NVRAM for passing information is extremely limited. UEFI therefore cannot be used to store numerous errors because the available NVRAM space can quickly fill up. This can hinder the UEFI's ability to pass other important information to the operating system. Additionally, once the NVRAM space is full, the UEFI either stops saving data to it or overwrites what is there. As a result, the UEFI may not be able to pass on the information necessary to troubleshoot and identify the source of the errors.

As a result, a need exists for improved error logging during system boot and shutdown.

SUMMARY

Examples described herein include systems and methods for improved error logging during device boot system and shutdown. In an example, a computing device can include a firmware interface, such as UEFI, that performs various booting functions, such as initializing and powering down hardware, launching an operating system ("OS"), and passing control of hardware to the OS. The OS can include a logging module, which can be responsible for managing logs of booting and shutdown events.

In an example, the UEFI can initialize some hardware components necessary for launching the computing device's OS. During its initial booting stages, the OS can initialize a logging module. The UEFI can hand over control of the hardware components to the OS. The OS can encounter multiple errors while initializing the remaining hardware components in the computing device. The logging module can be responsible for logging hardware initialization errors that occur before the OS has full access to the memory and has loaded enough to log errors to the memory. Between the moments when the logging module is loaded and when the OS is able to write error logs to the memory, the logging module can gather error logs of the most important errors and write them to the UEFI. In an example, the logging module can be configured to write up to a maximum number of error logs to the UEFI. In one example, the logging module can determine that the number of error logs is greater than the maximum number allowed. The logging module can prioritize the error logs according to a set of rules. In one example, the error logs can include a criticality level that indicates the potential impact the error can have on the computing device. The logging module can be configured to prioritize error logs with the highest priority levels. In another example, the logging module can prioritize error logs based on their timestamp. For example, at times an error can cause a chain reaction of errors. So that the source of the errors can be more easily identified, the logging module can prioritize the error logs with the earliest timestamps. In another example, the logging module can be configured to identify any errors that occur due to a dependency on another process that failed, and the logging module can ignore any dependent error logs.

In an example, the logging module can select the error logs with the highest priority up to the maximum number allowed. In one example, the logging module can modify the selected error logs using a shorthand form using an identifier ("log ID"). As an example, the selected logs can be modified as UEFI variables that use key/value pairs in a namespace. The selected error logs can be modified to include a key that maps to a corresponding value that is accessible by the OS. The OS can possess a mapping table, such as a lookup table, a hash table, or a configuration file, that points the OS to the correct error using the key.

In an example, the logging module can write the selected error logs to the UEFI. In one example, this can include writing the selected error logs to NVRAM. This can allow the error logs to persist even when the computing device powers down, which can be required for errors that occur during shutdown. The error logs can persist in the NVRAM for access after boot of the OS. Also, as the OS is launching one or more errors can cause the OS to reboot before the OS reaches the point where it can log errors to the memory. The logging module can capture the logs for these errors and write the highest prioritized error logs to the UEFI, which causes them to be saved in the NVRAM. The error logs can then be retrieved by the OS upon the next successful boot so that the cause of the reboot can be identified.

In an example, the UEFI can execute runtime services that are accessible by the OS. The logging module can interact with the runtime services to write the error logs to it. In an example, when the OS launches, it can start a system logger. The system logger can be part of the OS that maintains logs of events that help maintain and troubleshoot the OS. The system logger can access the error logs in the NVRAM using the UEFI runtime services. The system logger can retrieve the error logs and write them to a file. In one example, the system logger can send the error logs over a network, such as via email or a push notification. For example, the error logs can be sent to an administrative user for troubleshooting. Once the error logs are written to a file, the system logger can erase the error logs from the NVRAM.

The examples summarized above can each be incorporated into a non-transitory, computer-readable medium having instructions that, when executed by a processor associated with a computing device, cause the processor to perform the stages described. Additionally, the example methods summarized above can each be implemented in a system including, for example, a memory storage and a computing device having a processor that executes instructions to carry out the stages described.

Both the foregoing general description and the following detailed description are exemplary and explanatory only and are not restrictive of the examples, as claimed.

DESCRIPTION OF THE EXAMPLES

Reference will now be made in detail to the present examples, including examples illustrated in the accompanying drawings. Wherever possible, the same reference numbers will be used throughout the drawings to refer to the same or like parts.

Systems and methods are described for improved error logging during system boot and shutdown. A UEFI on a computing device can initialize some hardware components necessary for launching the computing device's OS. The OS can begin launching. The UEFI can pass control of the hardware to the OS and initialize runtime services. The OS can initialize a logging module. When errors occur during early system booting or late system shutdown, the logging module can gather the error logs and write them to the UEFI. Because of limited storage space with the UEFI, the logging module can prioritize the error logs according to a set of rules. The logging module can select error logs of the highest priority up to a predetermined maximum amount. The logging module can also rename the error logs using a shorthand form. When the OS finishes booting, or at least reaches a later point in the boot process where it can access the computing device's memory, the OS can launch a system logger. The system logger can retrieve the error logs from the UEFI, save them to a file, and erase them from the UEFI.

Figure 1:
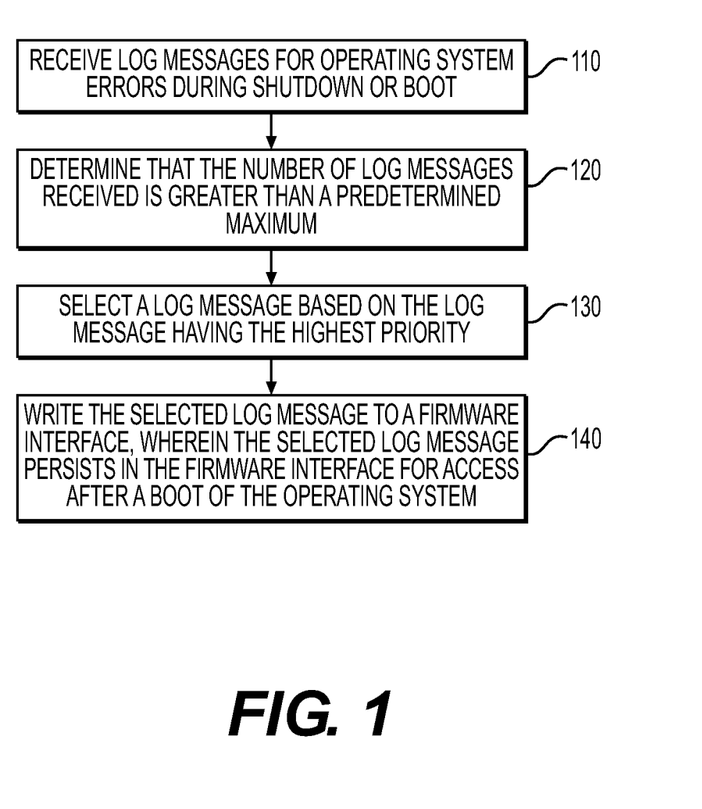
FIG. 1 is a flowchart of an example method for improved error logging during device boot and shutdown.

FIG. 1 is a flowchart of an example method for improved error logging during device boot and shutdown. At stage 110, a logging module can receive error logs of operating system errors. In an example, the logging module can be a process or application that runs on the OS and manages error logs generated during early stage booting of the OS. A computing device can be one or more processor-based devices, such as a personal computer, tablet, cell phone, or server. The hardware initialization firmware can be a software interface that operates between an OS and platform firmware that provides the OS with control of hardware. One example of hardware initialization software can be a UEFI. Although references are made to a UEFI throughout, the hardware initialization can be any software responsible for hardware initialization and that provides runtime services to an OS on a computing device. In an example, the UEFI can include boot services and runtime services. Boot services can include services that are available while the UEFI controls the platform firmware, and runtime services can include services that are accessible by an OS running on the computing device. In one example, the runtime services can allow the OS to interact with the UEFI and access data that the UEFI saves to the NVRAM.

In an example, when a user powers on the computing device, the computing device can initiate the UEFI. The UEFI can select a boot device and copy code from the boot sector of the boot device into physical memory of the computing device. The OS can then begin booting up and the UEFI can hand over control of the hardware to the OS. As part of the boot process, the OS can initialize the logging module. The OS can also begin initializing hardware on the computing device, such as random-access memory ("RAM"), disk drives, display adapters, audio inputs and outputs, and network adapters. As each hardware component initializes, the logging module can collect error logs for any errors that occur.

In an example, the logging module can also collect error logs for errors that occur during shutdown of the computing device. For example, when the OS shuts down, it can execute a sequence of stages that terminate software processes of the OS and shut down hardware components. Once the OS reaches a point in the shutdown process where it can no longer record error logs, it can turn over error logging to the logging module. The logging module can interact with the UEFI runtime to record logs for errors that occur during late system shutdown.

At stage 120, the logging module can determine that the number of error logs received is greater than a predetermined maximum. For example, an administrator can set a maximum number of error logs that can be stored in the NVRAM of the UEFI. In one example, the maximum number can be based on the limited storage space in the NVRAM. As an example, an administrator or boot agent can determine that there is sufficient space in the NVRAM to store three error logs. The administrator or agent can configure the logging module to allow up to three error logs to be written to the NVRAM.

At stage 130, the logging module can select an error log for writing to the NVRAM. In one example, selecting an error log can include selecting multiple error logs up to the predetermined maximum. In an example where the logging module receives more error logs than the predetermined allowed amount, the logging module can select error logs based on priority. In one example, the priority can be based on a criticality level and timestamps of the error logs. For example, the error logs can be assigned a criticality level based on how much they can impact the computing device. As an example, the error logs can be assigned one of three criticality levels, low, medium, and high. The logging module can prioritize the high criticality error logs over medium and low, it and prioritize the medium criticality messages over the low. This three-level priority structure is merely an example, and the logging module can use any number of criticality levels.

In one example, the logging module can prioritize error logs with earlier timestamps. For example, a single error during initialization of a hardware component can sometimes cause a chain reaction of errors. This can occur where multiple initialization steps are based on a previous step successfully executing. In one example, the error logs can be formatted so that the logging module can identify any dependencies. For example, an error log for a failed initialization step can include identifiers of any steps that it depends on to properly execute. The logging module can ignore or erase any error logs caused by a dependency.

To efficiently utilize the limited available space in the NVRAM and avoid redundancy, the logging module can select error logs with the highest criticality levels and the earliest timestamps that did not fail from a dependency. In one example, where multiple error logs have the same criticality level, the log module can use the timestamps or dependencies as prioritization tie breakers. For example, earlier messages can be prioritized first in a tie-breaking scenario. This can allow for selecting the most important error logs when more error logs exist than the maximum number allowed.

In one example, selecting the error logs can include renaming them. For example, to preserve space in the NVRAM and allow more error logs to be saved, the logging module can modify the selected error logs to a shorthand form. In an example, the shorthand form can include identifiers. As an example, the logging module can modify the error logs in the format "LogEFI-[id]" where [id] is an identifier that corresponds to the error log. A system logger in the OS can be configured to map the [id] field to information about the error, such as with a mapping table. The error information can be used to later identify and fix any issues causing the errors on the computing device.

At stage 140, the logging module can write the selected error log to the UEFI. In an example, this can include the logging module interacting with the UEFI runtime services to write the messages to the UEFI's NVRAM space. In one an example, the selected error logs can be written as UEFI variables. UEFI variables can be part of key/value pairs ("KVP") in a namespace. For example, the selected error logs can include a key that maps to a value that is accessible by the OS. The OS can include a mapping table, such as a lookup table, a hash table, or a configuration file, that points the OS to the correct message using the key.

As an example, the selected error logs can be rewritten using the "LogEFI-[id]" format described above. The OS can be configured to identify the selected messages as boot or shutdown error logs based on the "LogEFI." The [id] field can be the key in a KVP, and the OS can include a table that maps the key to corresponding values. In one example, a system logger in the OS can identify error logs in the NVRAM and map them to their corresponding values. In an example, the corresponding values can indicate the type of error that occurred. The OS can make the corresponding values available to an administrator for troubleshooting the errors.

In an example, the variables can include additional information. For example, the variables can include fields for an index, log type, and system state. Such a variable can be written as LogEFI-[index]-[logType]-[systemState]-[id]. In an example, [logType] can indicate the error type, [systemState] can indicate whether the device is booting or rebooting. The variable can be configured to include any desired information from the error log. In an example, the information included in the variable can be configured by an administrator. In another example, the variable can be configured using an interface of the UEFI.

Figure 2:
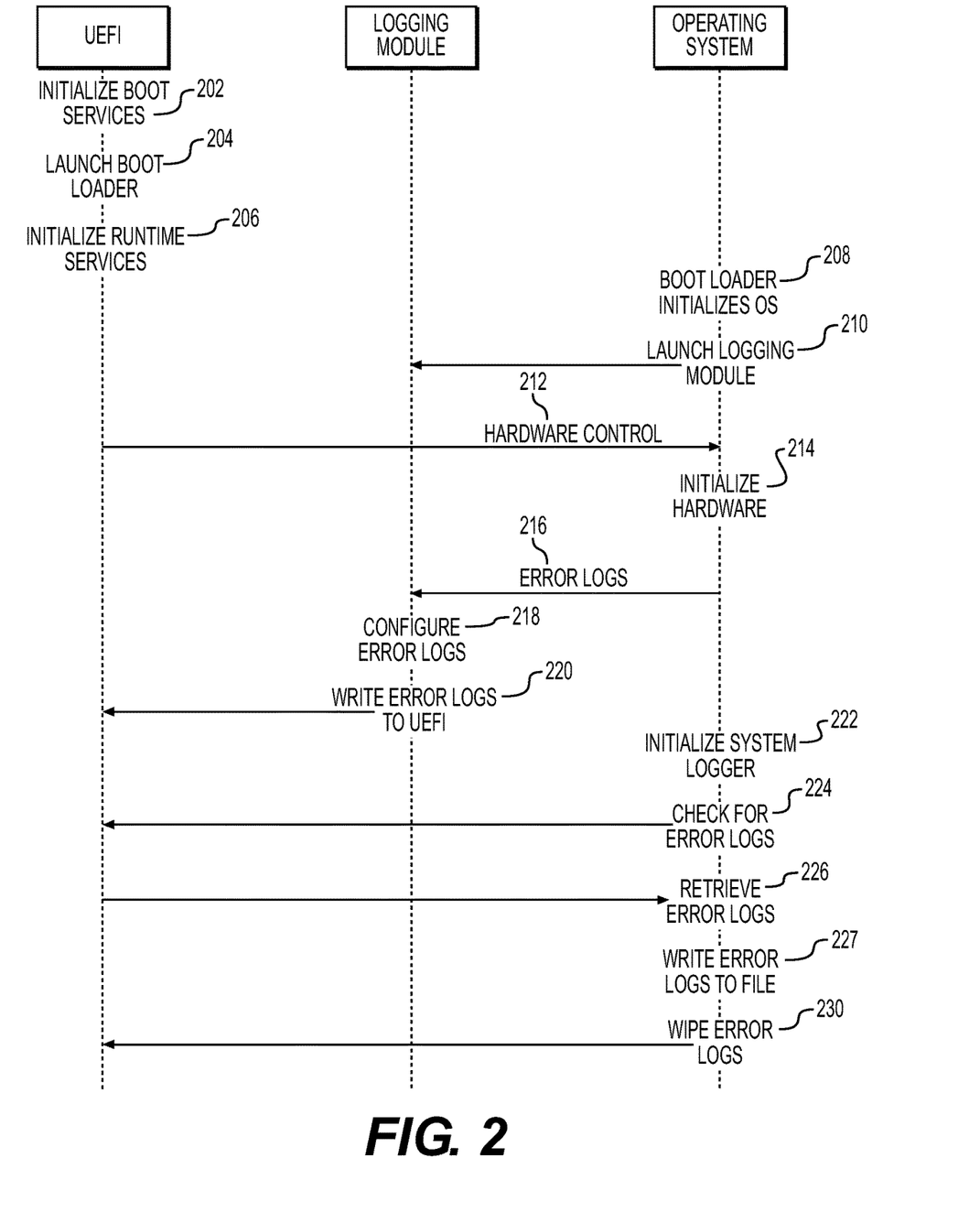
FIG. 2 is a sequence diagram of an example method for improved error logging during system boot and shutdown.

FIG. 2 is a sequence diagram of an example method for improved error logging during a system boot. At stage 202, a UEFI can initialize boot services on a computing device. For example, when a computing device is powered on it can execute code stored in an NVRAM that initiates the UEFI. The UEFI can initialize some hardware components necessary for launching the computing device's OS.

At stage 204, the UEFI can launch a boot loader 204. For example, the UEFI can first execute boot services, which are only available while the UEFI controls the hardware platform. One of the boot services can identify a boot device and copy code for the boot loader into physical memory of the computing device. Executing the boot loader code can cause the computing device to launch the OS at stage 208 below.

At stage 206, the UEFI can initialize runtime services. Runtime services can be services of the UEFI that are accessible by the OS. This can occur before, after, or concurrently with the boot loader launching the OS at stage 208. As one of the initial OS boot processes, the OS can launch the logging module at stage 210. The logging module can be responsible for logging hardware initialization errors that occur before the OS has loaded enough to log errors to the memory.

At stage 212, the UEFI can pass control of the hardware to the OS. can For example, the UEFI can present an option that allows a user to load a configuration interface where the user can modify UEFI configuration settings, such as the boot device sequence. In one example, the UEFI configuration interface can allow a user to change the number of error logs that can be made accessible by the logging module to the OS. This may be necessary where the computing device experiences numerous failures during the boot process and additional error logs are required to identify the problem source.

At stage 214, the OS can begin initializing the remaining hardware components. For example, the OS can begin initializing RAM, disk drives, display adapters, audio inputs and outputs, and network adapters. As errors occur during the hardware initialization, the logging module can collect the error logs at stage 216. In an example, the error logs can indicate a level of severity of the error. As an example, event logs can be informational, warning, and error. Information events can be recorded simply for audit purposes. Warning events can be recorded to indicate that a condition has a occurred that is not severe, but failure to fix the condition can lead to a more severe event. Error logs can indicate a failure or critical condition that impairs the functionality of the hardware component. In one example, the event log types can have a hierarchy according to criticality. For example, information events can be low priority, warning events can be medium priority, and error logs can be high priority.

At stage 218, the logging module can configure the collected error logs. In an example, the error logs can be prioritized according to a set of rules. In some examples, the rules can prioritize the messages by their criticality level and timestamp. For example, the error logs can be assigned a criticality level based on how much they can impact the computing device, such as the informational, warning, and error classifications described above or low, medium, and high. The logging module can prioritize messages with higher criticality levels. Criticality levels can be adjusted by an administrator in an example and stored in a table that the logging module can access during boot or shutdown.

In one example, the logging module can prioritize error logs with earlier timestamps. For example, a single error during initialization of a hardware component can sometimes cause a chain reaction of errors. To help identify the error that caused the chain reaction, the logging module can prioritize messages of equal criticality level based on their timestamps.

UEFIs can have extremely limited NVRAM space available for saving data to make available to an OS. However, passing error logs for boot failures to the OS can be crucial for identifying the source of hardware problems. For that reason, the logging module can be configured to execute certain operations that maximizes the number of error logs that can be passed to the OS while minimizing the space required in the NVRAM for those messages. In an example, the logging module can be configured to limit the number of error logs that can be passed to the OS. The logging module can select error logs with the highest priority for passing to the OS up to the predetermined maximum. As an example, the logging module can be configured to pass up to three error logs to the OS. Where the UEFI creates three or fewer error logs, the logging module can pass all of them to the OS. Where the UEFI creates more than three error logs, the logging module can prioritize the error logs and pass on the error logs with the highest priority. In one example, where the logging module receives two error logs of each of three criticality levels, the logging module can pass on the two error logs with the highest criticality level and the error message of the middle criticality level that has the earliest timestamp. In another example, where the logging module receives more than three error logs with the highest criticality level, the logging module can pass on the three highest criticality error logs with the earliest timestamps.

In still another example, the logging module can remove error logs based on dependencies. As an example, the logging module can receive five error logs, named "error1," "error2," "error3," "error4," and "error5." The error logs can create can include timestamps such that "error1" has the earliest timestamp and "error5" has the latest timestamp. The logging module can include a table of dependencies that shows which booting processes each booting processes is dependent on. The logging module can compare the error logs to the table to determine that "error2" depends on "error1" and "error4" depends on "error3." The logging module can remove "error2" and "error4" because they likely failed because of their dependent processes failing. The logging module can then prioritize "error1," "error3" and "error5."

In an example, configuring the error logs can include modifying them using a shorthand form. For example, the error logs can be modified to be written as log IDs. For example, to preserve space in the NVRAM and allow more error logs to be saved, the log IDs can be shorthand identifiers of the error logs. The log IDs can include a key for a KVP in a namespace, and the key can map to a value that is accessible by the OS. The OS can include a mapping table, such as a lookup table, a hash table, or a configuration file, that points the OS to the correct message using the key. In one example, the logging module can modify only the error logs selected to be passed on to the OS.

At stage 220, the logging module can write the log IDs to the UEFI. In an example, this can include the logging module interacting with the UEFI runtime services to write the messages to the UEFI's NVRAM space. In another example, the log IDs can be written as UEFI variables that can be accessed by the OS after the OS finishing booting.

In one example, the logging module can dynamically prioritize and manage the error logs. As an example, the logging module can be configured to allow a maximum number of log IDs to be passed to the OS. When the logging module receives a first error message, the logging module can prioritize it, modify it, and write it to the NVRAM. The logging module can do this for each error message up to the maximum allowed. Once the maximum has been reached, as subsequent error logs are created the logging module can compare their priority to that of the log IDs that have been written to the NVRAM. Where a subsequent message has a greater priority than at least one of the log IDs in the NVRAM, the logging module can add the log ID of the new message and erase the log ID with the lowest priority. Where a subsequent message does not have a greater priority than any of the log IDs in the NVRAM, the logging module can simply erase it. In one example, where the logging module fills the allotted NVRAM space with log IDs of the highest criticality level, the logging module can simply erase any subsequent error logs because the subsequent error logs would have a lower priority due to the timestamp priority rule.

In an example, the logging module can write the variables using predetermined size allotments that maximize usage efficiency in the limited NVRAM space. For example, many UEFIs provide a mechanism to select whether variables are extended, overwritten, or deleted. Due to normal memory usage patterns, when the extended option is selected, the UEFI can copy data to a new array and extended. The variables can be written in blocks that match or use up to the data block size for the new arrays. As an example, where the UEFI copies the data in blocks of 4096 bytes, the variables can be written in groups of up to 4096 bytes. The examples below describe using a limit of 4096 bytes, but the size limit can be any size up to the maximum allowed by the UEFI. Although variables can be written using much less than 4096 bytes, doing so would result in wasted memory space when the UEFI copies the data over in blocks of 4096 bytes. Accordingly, the logging module can be configured to group the variables until the 4096-byte limit is reached, write that group to memory, and then start a new variable group. For example, the logging module can initially store variables in an internal cache. Once the 4096-byte limit is reached, or after the hardware initialization process is completed, the logging module can write variables from the internal cache to the NVRAM.

In one example, prior to logging the variables, the logging module can first check the available space in the NVRAM. For example, the NVRAM is shared with other sub-systems. In an instance where the NVRAM space is filled, the logging module can be configured to cease logging to the UEFI during the boot.

At stage 222, the OS can initialize a system logger. The system logger can be part of the OS that maintains logs of events that help maintain and troubleshoot the OS. For example, the system logger can maintain a system log ("syslog") that includes records of OS events. Data in the syslog can help determine whether the OS or hardware components of the computing device are functioning properly. However, because the OS does not launch until after the UEFI initializes the hardware, the system logger cannot detect or log failure events during the hardware initialization process.

At stage 224, the system logger can check the UEFI runtime services for the log IDs. For example, the UEFI runtime services can grant the system logger access the NVRAM where log IDs are stored. At stage 226, the system logger can retrieve log IDs.

At stage 228, the system logger can write the log IDs to a file. In one example, the file can be a local file on the computing device that can be accessed from the OS. In another example, the OS can send the file over a network. For example, an administrator, such as a support user, can be subscribed to boot errors on the computing device. The computing device can send file to a computing device of the administrator, such as by sending an email or push notification.

At stage 230, the system logger can wipe the log IDs. For example, the system logger can erase the log IDs from the NVRAM. This can be important for continuous logging of booting errors. For example, some UEFIs are configured to stop saving data to the NVRAM once the available storage space is filled. Once the system logger writes the files to a file accessible by the OS, the log IDs stored in the UEFI's NVRAM become redundant. The system logger can wipe the log IDs from the NVRAM so that new error logs can be logged on the next boot.

Figure 3:
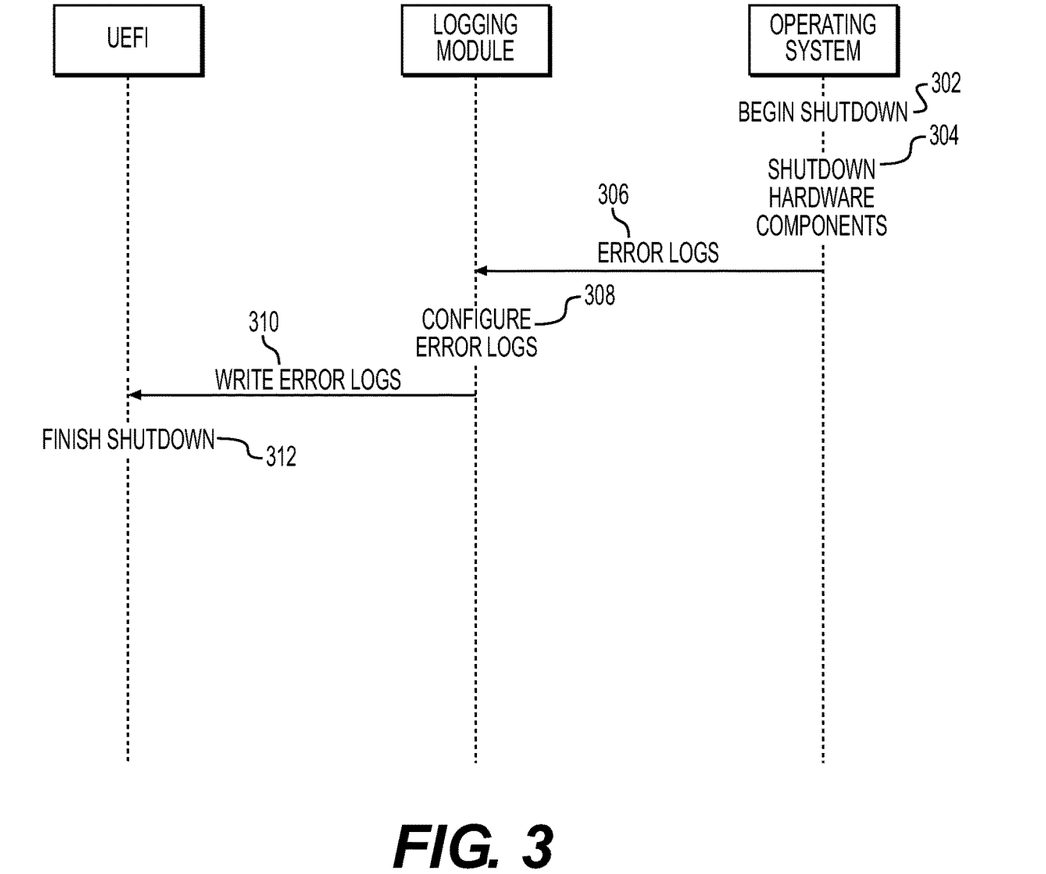
FIG. 3 is a sequence diagram of an example method for improved error logging during device boot and shutdown.

Hardware failures can also occur when a computing device shuts down. FIG. 3 is a sequence diagram of an example method for improved error logging during a system shutdown. At stage 302, the OS can begin shutting down. A shutdown can include a complete power down or a reboot. In some examples, the shutdown can be initiated by a user, the OS, or a remote device. Upon receiving instructions to shut down, the OS can close any open applications and terminate OS services in a controlled manner.

At stage 304, the OS can begin shutting down hardware components. While shutting down the hardware components, at stage 306, the logging module can receive logs for any errors that occur. In an example, the error logs can indicate a level of severity of the error, such as informational, warning, and critical or low, medium, and high.

At stage 308, the logging module can configure the error logs. In an example, the messages can be configured according to a set of rules. For example, a rule can prioritize the messages based on their criticality level. The error logs can be assigned a criticality level based on how much they can impact the computing device. As an example, the error logs can be assigned a criticality level from 1 to 5 with 1 being the least impactful and 5 being the most. The logging module can prioritize messages with higher criticality levels over those with lower criticality levels.

Another example rule can prioritize error logs based on their timestamps. For example, a single error during initialization of a hardware component can sometimes cause a chain reaction of errors. To help identify the error that caused the chain reaction, the logging module can prioritize messages of equal criticality level based on which messages have the earliest timestamps. In one example, the logging module can remove error logs based on dependencies. For example, where one error message likely occurred because of a previous error occurring, the logging module can ignore the dependent error message.

In an example, configuring the error logs can include modifying them using a shorthand form. For example, the error logs can be rewritten as UEFI variables that include log IDs. In one example, to preserve space in the NVRAM and allow more error logs to be saved, the log IDs can be shorthand identifiers of the error logs. For example, log IDs can include a key for a KVP in a namespace, and the key can map to a value that is accessible by the OS. The OS can include a mapping table, such as a lookup table, a hash table, or a configuration file, that points the OS to the correct message using the key. In one example, the logging module can modify only the error logs selected to be passed on to the OS.

At stage 310, the logging module can write the log IDs to the UEFI. In an example, this can include writing log IDs to the NVRAM. In another example, the log IDs can be written as UEFI variables that can be accessed by the OS after the OS launches. In another example, to preserve space in the NVRAM, the logging module can limit the number of log IDs that can be written. For example, an administrator can configure the logging module to only allow a certain number of error logs to be written to the NVRAM during shutdown.

In one example, the logging module can dynamically prioritize and manage the error logs. For example, the logging module can prioritize, modify, and write error logs as they are created by the UEFI. Where the UEFI creates an error message with a higher priority than one previously written to the NVRAM and the maximum number of error logs has already been reached, the logging module can write it to the NVRAM and erase the error message with the lowest priority.

In one example, prior to logging the variables, the logging module can first check the available space in the NVRAM. For example, the NVRAM is shared with other sub-systems. In an instance where the NVRAM space is filled, the logging module can be configured to terminate logging processes during the shutdown.

At stage 318, the UEFI can finishing shutting down the computing device.

Sometimes the computing device may encounter errors during both the shutdown and boot processes. In one example, the number of shutdown error logs can be determined independent of any boot messages. For example, the logging module can be configured to allow a maximum number of shutdown error logs and a maximum number of boot error logs. In another example, the logging module can prioritize one message type over another, such as by prioritizing shutdown error logs over boot error logs.

Figure 4:
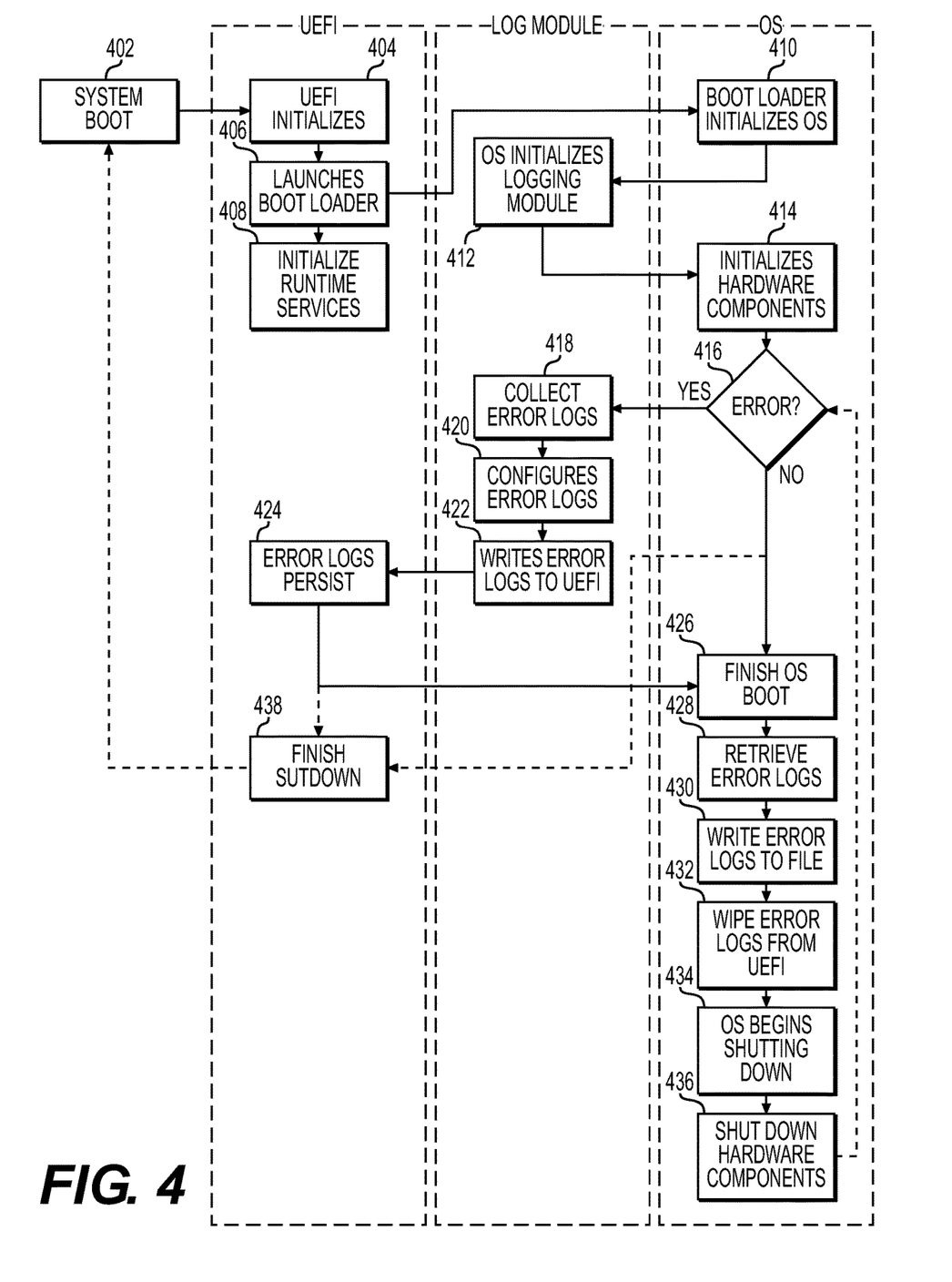
FIG. 4 is a flowchart of an example method for improved error logging during system boot and shutdown and shutdown.

FIG. 4 is a flowchart of an example method for improved error logging during system boot and shutdown cycle. Stages 402-432 illustrate an example method of logging operating system errors while a device boots. Stages 434-438 illustrate an example method of logging operating system errors while a device shuts down.

At stage 402, the computing device can boot. In some examples, the computing device can be powered on or begin booting after a restart. The computing device can then begin executing stored code that executes the booting process. As part of the booting process, at stage 404 the computing device can initialize the UEFI. For example, the device's CPU can execute code stored in an NVRAM that initiates the UEFI. The UEFI can initialize some hardware components necessary for launching the computing device's OS.

At stage 406, the UEFI can launch a boot loader. The boot loader can cause the CPU can load code into the computer's memory that causes the OS to initialize at stage 410.

At stage 408, the UEFI can initialize runtime services, which are services available to the OS. This can occur before, after, or concurrently with the boot loader launching the OS at stage 410.

At stage 412, the OS can initialize the logging module. The logging module can be responsible for logging hardware initialization errors that occur before the OS has loaded enough to log errors to the memory. In an example, the logging module can be an application or agent executing as part of the OS.

At stage 414, the OS can initialize hardware components of the computing device, such as RAM, disk drives, display adapters, audio inputs and outputs, and network adapters. At stage 416, if no errors occur during hardware initialization, the method can continue to stage 426 where the OS finishes booting. However, where one or more errors do occur, the method can proceed to stage 418 where the logging module collects the error logs. In an example, the error logs can indicate a level of severity of the error, such as informational, warning, and critical or low, medium, and high. In one example, the logging module can collect the messages once the hardware initialization process is complete. In an alternative example, the logging message can collect error logs as they are created.

At stage 416, the logging module can configure the error logs. In an example, configuring the error logs can include prioritizing them. For example, the logging module can prioritize the messages according to the criticality level and timestamp. In one example, each error can be associated with a criticality level that indicates the negative impact level the error can have on the computing device. Errors with higher criticality levels can be prioritized over those with lower criticality levels. For errors with the same criticality levels, the logging module can further prioritize them based on other criteria, such as a timestamp. For example, the logging module can give a higher priority to errors that occurred first.

In an example, configuring the error logs can include modifying them using a shorthand form. For example, the error logs can be modified to include log IDs. In an example, the log IDs can be part of a KVP in a namespace. The log IDs can include an identifier that corresponds to the KVP key, and the identifier can map to a value that is accessible by the OS. The OS can include a mapping table, such as a lookup table, a hash table, or a configuration file, that points the OS to the correct message using the key. In one example, the logging module can modify only the error logs selected to be passed on to the OS.

At stage 422, the logging module can write the log errors to the UEFI. In an example, the logging module can interact with the UEFI runtime services to pass the log errors to the UEFI where they can be written to the UEFI's NVRAM space. In an example, the logging module can write the log IDs to the NVRAM as UEFI variables. At stage 424, the error logs can persist in the NVRAM space of the UEFI. This can present them from being erased if the OS fails to complete the boot process and is forced to restart. The method can then proceed to stage 426 where the OS finishes booting.

At stage 428, the OS can retrieve the error logs from the UEFI NVRAM space. In one example, this stage can be executed by a system logger in the OS. The system logger can be part of the OS that maintains logs of events that help maintain and troubleshoot the OS. At stage 430, the system logger can write the error logs to a file. In one example, the system logger can write the log IDs to a local file on the computing device. In an alternative example, the logging module can send the log IDs over a network, such as via email or a push notification. At stage 432, the system logger can wipe the error logs from the NVRAM. For example, the system logger can interact with the UEFI runtime services to erase all error logs saved in the NVRAM allocated to UEFI error logs.

At stage 434, the OS can begin shutting down. The dashed lines in FIG. 4 indicate the steps of the shutdown process. The OS shutdown can begin because a user or the OS itself initiating a complete shutdown or a restart of the computing device. In one example, the restart can occur after the OS fails to finish booting due to a hardware initialization error. During the shutdown, the OS can perform preprogrammed steps for closing applications and shutting down OS services.

At stage 436, the OS can begin shutting down hardware components. For example, the OS can execute stored code for properly shutting down the hardware components. The method can then proceed to stage 416 again for the error check. If no errors occur, the method can proceed to stage 438 where the computing device finishes shutting down. For example, the OS can shut down most of the hardware components and pass control of the hardware to the UEFI, which can finish shutting down the computing device. If any errors do occur, the computing device can proceed through stages 418, 420, 422, and 424 again. At stage 418 the logging module can receive the error message. At stage 420 the logging module can configure the error logs. Finally, at stage 422, the logging module can write the error logs to the UEFI's NVRAM space, and at stage 424 the error logs can persist in the NVRAM. By writing the error logs to the NVRAM during shutdown, the error logs persist despite the computing device powering down. This can allow the error logs of shutdown errors to persist and be retrieved by the OS after the next boot. At stage 438, the computing device can finish shutting down.

As an example, after writing the shutdown log errors to the NVRAM at stage 422, the computing device can finish shutting down at stage 438. The method can then return to stage 402 where the computing device boots again. The logging module can handle configuring error logs differently where shutdown error logs are already saved in the NVRAM when the device boots. In one example, the logging module can be configured to allow a maximum number of shutdown log IDs and a separate maximum number of boot log IDs when both occur. In another example, the logging module can prioritize one message type over another, such as by prioritizing shutdown error logs over boot error logs. In still another example, the logging module can erase shutdown log IDs saved to the NVRAM that have a lower priority than errors that occur during boot. Once the OS launches and the system logger writes out the saved log IDs from the NVRAM, the system logger can erase all the log IDs from the NVRAM.

Figure 5:
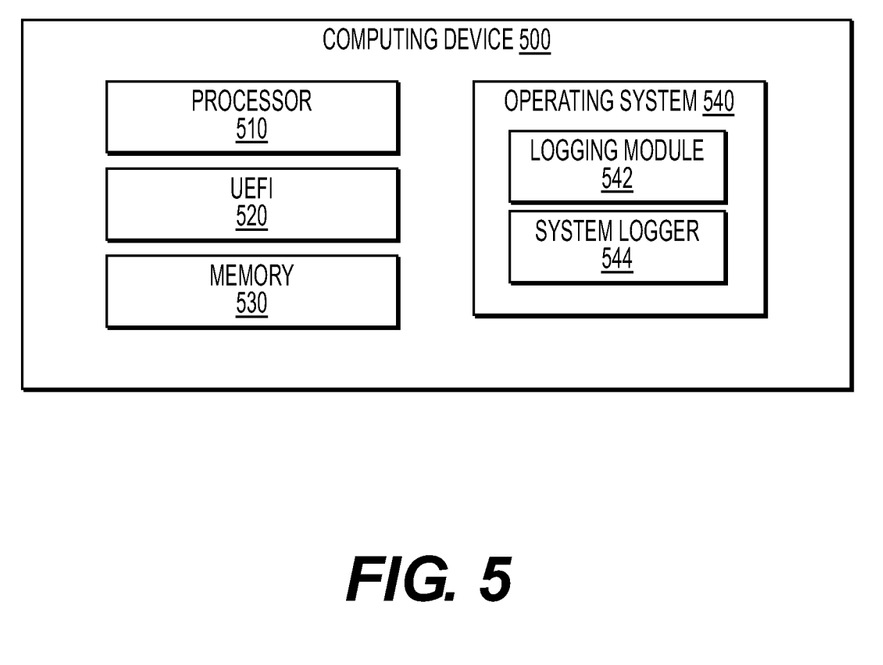
FIG. 5 is an illustration of an example system for improved error logging during device boot and shutdown.

FIG. 5 is an illustration of a system for improved error logging during device boot and shutdown. A computing device 500 can include a processor 510, a UEFI 520, a memory 530, and an OS 540. The computing device 500 can be one or more processor-based devices, such as a server, personal computer, tablet, or cell phone. Although references are made to a "computing device" throughout, the computing device can comprise multiple devices, including virtual or cloud-based devices.

The processor 510 can be a central processing unit ("CPU") that executes instructions for software applications, including the UEFI 520. The UEFI 520 can be a software interface that operates between an operating system and platform firmware that provides control of hardware. The UEFI 520 can also be responsible for initializing some hardware components in the computing device 500 and launching a boot loader that in turn launches the OS 540. The UEFI 520 can be stored on the memory 530 in an example, which can be a persistent memory that retains data when the computing device 500 is without power. In one example, the memory 530 can be NVRAM.

When the computing device 500 is powered on, the processor 510 can initialize the UEFI 520. The UEFI 520 can detect available hardware and initialize enough of them so that it can load a boot loader into the memory 530 and the OS 540 can launch. Some examples of hardware can include a hard drive, the memory 530, input/output components, and network components. Once the OS 540 reaches a certain point in the boot process, it can launch a logging module 542. In an example, the logging module 542 can be an application or agent executing on the computing device 500 as part of the OS 540. The logging module can be responsible for logging hardware initialization and OS errors that occur before the OS 540 has full access to the memory and has loaded enough to log errors to a volatile memory. When an error occurs, the logging module 542 can be configured to prioritize and modify the error logs so that the largest amount and most important error logs can be written to the memory 530 where they can persist until the OS 540 can finish loading and retrieve them.

In an example, the OS 540 can include a system logger 544 that maintains logs of events that help maintain and troubleshoot the OS 540. For example, the system logger 544 can maintain a system log ("syslog") that includes records of OS events. Data in the syslog can help determine whether the OS 540 or hardware components of the computing device are functioning properly. The system logger 542 can be loaded later in the booting process than the logging module 542. In an example, the system logger 542 can be responsible for retrieving error logs from the memory 530 and writing them to a file or sending them over a network. The system logger 542 can also be responsible for wiping the error logs from the memory 530 after they have been retrieved and written to a file.

Other examples of the disclosure will be apparent to those skilled in the art from consideration of the specification and practice of the examples disclosed herein. Though some of the described methods have been presented as a series of steps, it should be appreciated that one or more steps can occur simultaneously, in an overlapping fashion, or in a different order. The order of steps presented are only illustrative of the possibilities and those steps can be executed or performed in any suitable fashion. Moreover, the various features of the examples described here are not mutually exclusive. Rather any feature of any example described here can be incorporated into any other suitable example. It is intended that the specification and examples be considered as exemplary only, with a true scope and spirit of the disclosure being indicated by the following claims.

What is claimed is:

1. A method for improved error logging, comprising:
receiving, at a computing device, a plurality of error logs for operating system errors during shutdown or boot of the computing device, wherein the error logs are received when the operating system cannot access a hardware component of the computing device, and wherein the hardware component is not yet initialized or is shutdown;
determining that the error logs exceed a space or number threshold for logging in firmware;
selecting an error log from the plurality of error logs based on the error log having a highest priority of the plurality of error logs; and
writing a log identifier for the selected error log to a firmware interface of the computing device, wherein the log identifier persists in the firmware interface for access after a boot of the operating system.

2. The method of claim 1, further comprising:
retrieving, by a system logger, the log identifier from the firmware interface;
writing, by the system logger, the log identifier to a file; and
erasing, by the system logger, the log identifier from the firmware interface.

3. The method of claim 1, further comprising:
retrieving, by a system logger, the log identifier from the firmware interface;
writing, by the system logger, the selected error log corresponding to the log identifier to a file; and
erasing, by the system logger, the log identifier from the firmware interface.

4. The method of claim 1, wherein the firmware interface is a Unified Extensive Firmware Interface ("UEFI").

5. The method of claim 4, wherein the log identifier is written to a non-volatile memory as a UEFI runtime variable.

6. The method of claim 1, wherein writing the log identifier further comprises writing the selected error log corresponding to the log identifier.

7. The method of claim 1, wherein each of the error logs includes a criticality level and a timestamp, and the highest priority of the error logs is determined based on the criticality levels and timestamps.

8. A non-transitory, computer-readable medium containing instructions that, when executed by a hardware-based processor, cause the processor to perform stages for improved error logging, the stages comprising:
receiving, at a computing device, a plurality of error logs for operating system errors during shutdown or boot of the computing device, wherein the error logs are received when the operating system cannot access a hardware component of the computing device, and wherein the hardware component is not yet initialized or is shutdown;
determining that the error logs exceed a space or number threshold for logging in firmware;
selecting an error log from the plurality of error logs based on the error log having a highest priority of the plurality of error logs; and
writing a log identifier for the selected error log to a firmware interface of the computing device, wherein the log identifier persists in the firmware interface for access after a boot of the operating system.

9. The non-transitory, computer-readable medium of claim 8, the stages further comprising:
retrieving, by a system logger, the log identifier from the firmware interface;
writing, by the system logger, the log identifier to a file; and
erasing, by the system logger, the log identifier from the firmware interface.

10. The non-transitory, computer-readable medium of claim 8, the stages further comprising:
retrieving, by a system logger, the log identifier from the firmware interface;
writing, by the system logger, the selected error log corresponding to the log identifier to a file; and
erasing, by the system logger, the log identifier from the firmware interface.

11. The non-transitory, computer-readable medium of claim 8, wherein the firmware interface is a Unified Extensive Firmware Interface ("UEFI").

12. The non-transitory, computer-readable medium of claim 11, wherein the log identifier is written to a non-volatile memory as a UEFI runtime variable.

13. The non-transitory, computer-readable medium of claim 8, wherein writing the log identifier further comprises writing the selected error log corresponding to the log identifier.

14. The non-transitory, computer-readable medium of claim 8, wherein each of the error logs includes a criticality level and a timestamp, and the highest priority of the error logs is determined based on the criticality levels and timestamps.

15. A system for improved error logging, comprising:
a memory storage including a non-transitory, computer-readable medium comprising instructions; and
a computing device including a hardware-based processor that executes the instructions to carry out stages comprising:
receiving, at a computing device, a plurality of error logs for operating system errors during shutdown or boot of the computing device, wherein the error logs are received when the operating system cannot access a hardware component of the computing device, and wherein the hardware component is not yet initialized or is shutdown;
determining that the error logs exceed a space or number threshold for logging in firmware;
selecting an error log from the plurality of error logs based on the error log having a highest priority of the plurality of error logs; and
writing a log identifier for the selected error log to a firmware interface of the computing device, wherein the log identifier persists in the firmware interface for access after a boot of the operating system.

16. The system of claim 15, the stages further comprising:
retrieving, by a system logger, the log identifier from the firmware interface;
writing, by the system logger, the log identifier to a file; and
erasing, by the system logger, the log identifier from the firmware interface.

17. The system of claim 15, the stages further comprising:
retrieving, by a system logger, the log identifier from the firmware interface;
writing, by the system logger, the selected error log corresponding to the log identifier to a file; and
erasing, by the system logger, the log identifier from the firmware interface.

18. The system of claim 15, wherein the firmware interface is a Unified Extensive Firmware Interface ("UEFI").

19. The system of claim 18, wherein the log identifier is written to a non-volatile memory as a UEFI runtime variable.

20. The system of claim 15, wherein writing the log identifier further comprises writing the selected error log corresponding to the log identifier.

* * * * *